(12) United States Patent
Altenrath

(10) Patent No.: US 11,353,146 B2
(45) Date of Patent: Jun. 7, 2022

(54) TUBE CONNECTION

(71) Applicant: Eaton Intelligent Power Limited, Dublin (IE)

(72) Inventor: Joerg Altenrath, Lohmar (DE)

(73) Assignee: Danfoss Power Solutions II Technology A/S, Nordborg (DK)

( * ) Notice: Subject to any disclaimer, the term of this patent is extended or adjusted under 35 U.S.C. 154(b) by 0 days.

(21) Appl. No.: 16/954,560

(22) PCT Filed: Dec. 10, 2018

(86) PCT No.: PCT/EP2018/084121
§ 371 (c)(1),
(2) Date: Jun. 17, 2020

(87) PCT Pub. No.: WO2019/121091
PCT Pub. Date: Jun. 27, 2019

(65) Prior Publication Data
US 2020/0309291 A1 Oct. 1, 2020

(30) Foreign Application Priority Data
Dec. 18, 2017 (GB) ...................................... 1721113

(51) Int. Cl.
*F16L 15/06* (2006.01)
(52) U.S. Cl.
CPC .................................. *F16L 15/06* (2013.01)
(58) Field of Classification Search
CPC ......... F16L 15/06; F16L 15/001; F16L 33/24; E21B 17/042

USPC .......................................... 285/245, 239, 390
See application file for complete search history.

(56) References Cited

U.S. PATENT DOCUMENTS

| | | | |
|---|---|---|---|
| 635,636 A | 10/1899 | Bailey | |
| 2,094,491 A * | 9/1937 | Janata | F16L 15/001 285/333 |
| 2,245,419 A * | 6/1941 | Unke | B21H 3/00 285/390 |
| 2,267,923 A * | 12/1941 | Johnson | F16L 15/001 285/334 |
| 2,371,971 A * | 3/1945 | Main | F16L 33/24 285/259 |
| 2,476,480 A * | 7/1949 | Burckle | F16L 33/01 285/222.1 |
| 2,540,113 A * | 2/1951 | Hartley | F16L 33/24 285/245 |
| 2,580,818 A | 1/1952 | Bashford et al. | |

(Continued)

FOREIGN PATENT DOCUMENTS

FR 58553 E 1/1954
GB 1133125 A 11/1968

*Primary Examiner* — David Bochna
(74) *Attorney, Agent, or Firm* — Leydig, Voit & Mayer, Ltd.

(57) ABSTRACT

A tube connection for connection to a tube includes: a body having a through hole with a central axis, a first end, a second end, and an internal thread arranged close to the first end and coaxial with the central axis. The internal thread has a constant pitch diameter. A maximum diameter of the internal thread increases in an axial direction from the first end towards the second end. A minimum diameter of the internal thread decreases in the axial direction from the first end towards the second end.

6 Claims, 2 Drawing Sheets

(56) References Cited

U.S. PATENT DOCUMENTS

| | | | | |
|---|---|---|---|---|
| 2,768,009 | A | * | 10/1956 | Currie .................... F16L 33/24 |
| | | | | 285/251 |
| 2,816,781 | A | * | 12/1957 | Woodling ............... F16L 33/24 |
| | | | | 285/222.4 |
| 4,121,862 | A | * | 10/1978 | Greer .................... F16L 15/001 |
| | | | | 285/333 |
| 4,488,738 | A | | 12/1984 | Valdes |
| 4,583,767 | A | * | 4/1986 | Hansen ................ F16L 33/223 |
| | | | | 285/245 |
| 5,582,439 | A | * | 12/1996 | Spears .................... F16L 15/08 |
| | | | | 285/333 |
| 7,017,951 | B2 | * | 3/2006 | Spears ................ F16L 15/001 |
| | | | | 285/333 |

\* cited by examiner

TUBE CONNECTION

CROSS-REFERENCE TO PRIOR APPLICATIONS

This application is a U.S. National Phase application under 35 U.S.C. § 371 of International Application No. PCT/EP2018/084121, filed on Dec. 10, 2018, and claims benefit to British Patent Application No. GB 1721113.7, filed on Dec. 18, 2017. The International Application was published in English on Jun. 27, 2019 as WO 2019/121091 under PCT Article 21(2).

FIELD

The invention relates to a tube connection for example a hose fitting for connection to a tube, which tube connection comprises a body having a through hole with a central axis, a first end, a second end, an internal thread arranged close to the first end and coaxial with the central axis, wherein the internal thread has a constant pitch diameter.

BACKGROUND

Such a tube connection is known from GB 810628. This publication discloses a body with a through hole and an internal thread, such that a nut like ring is provided. The body is arranged on a tube and maintained at the tube by a ridge arranged in the tube wall. At the tube end, a hose is arranged. Then the nut like ring is rotated onto the hose, such that the thread cuts into the hose and secures the hose to the tube.

The disadvantage is that the tube end needs to be deformed to provide a ridge, which requires special equipment, which is not always available, especially during repairs by a user when a tube part is to be exchanged.

U.S. Pat. No. 4,488,738 discloses a tube connection wherein the body is provided with a through hole in which a tapering thread is arranged, such that the pitch diameter decreases. The thread depth starts at virtually zero and increases, such that when a tube is inserted into the through hole by rotating, a thread is cut into the tube.

The pitch diameter of a particular thread, internal or external, is the diameter of a cylindrical surface, axially concentric to the thread, which intersects the thread flanks at equidistant points, when viewed in a cross-sectional plane containing the axis of the thread, the distance between these points being exactly one half the pitch distance.

Due to the tapering shape of the thread, the connection is less suitable to take up axial and radial forces. Such forces urge the tube out of the tube connection due to the tapering shape of the though hole and thread. The largest part of the axial forces is to be taken up by the last turn of the thread and as soon as this last turn fails, the connection will come loose.

It is also known to connect a tube to for example a fitting by brazing. Brazing allows for strong connections, which are typically suitable for high pressure applications. However, brazing is time consuming, labor intensive, expensive and prone to errors. Furthermore, long tubes cannot be brazed, as they do not fit in the typical brazing furnace. As a result, the brazing process is typically not suitable, for short term orders or for repairs of damaged connections.

SUMMARY

In an embodiment, the present invention provides a tube connection for connection to a tube, comprising: a body having a through hole with a central axis, a first end, a second end, and an internal thread arranged close to the first end and coaxial with the central axis, wherein the internal thread has a constant pitch diameter, wherein a maximum diameter of the internal thread increases in an axial direction from the first end towards the second end, and wherein a minimum diameter of the internal thread decreases in the axial direction from the first end towards the second end.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
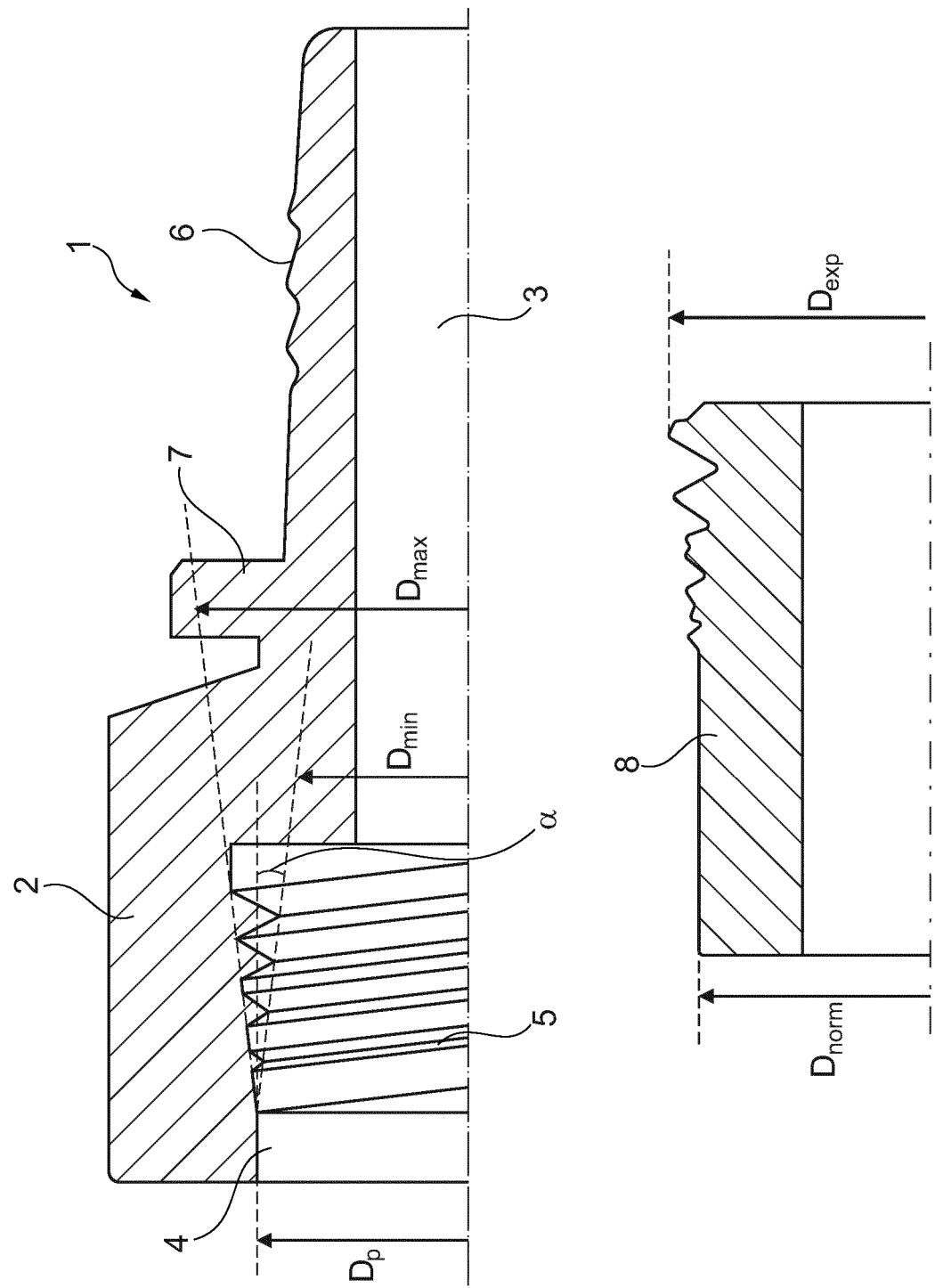
FIG. 1 shows an embodiment of a tube connection according to the invention and a tube end in exploded view.

In an embodiment, the present invention reduces or even removes the above mentioned disadvantages.

In an embodiment, the present invention provides a tube connection, which is characterized in that the maximum diameter of the thread increases in axial direction from the first end towards the second end and wherein the minimum diameter of the thread decrease in axial direction from the first end towards the second end.

As the thread of the tube connection has a constant pitch diameter, while the maximum diameter increases and the minimum diameter decreases, a tube, which is inserted in the tube connection by rotation, will have an end being flared outwardly. This is caused by the minimum diameter of the thread which will deform the material of the tube when rotated inwardly in the through hole. The deformed material will be pushed into the space provided by the increasing maximum diameter of the thread.

The resulting shape of the tube end will be flared outwardly, while the shape of the internal thread in the through hole is conical, widening from the first end inwardly toward the second end. As a result a shape defined connection between the tube connection and the tube is provided, which is not only dependent on a single turn of the thread like in U.S. Pat. No. 4,488,738.

An additional advantage of the invention is that the tube connection can be made without any specialized tools. As long as sufficient torque can be generated to rotate a straight tube end into the tube connection, a reliable connection can be achieved.

To ensure a leak tight connection, a special glue can be provided between the tube end and the tube connection, or a soft seal or thermoplastic seal could be arranged in the area of the tube end.

In a preferred embodiment of the tube connection according to the invention the thread starts at a distance from the first end, such that a cylindrical surface is provided in the through hole between the first end and the thread.

The cylindrical surface provides support for the tube end, such that insertion of the tube end is facilitated, but also for withstanding bending stresses exerted on the tube end. With the cylindrical surface, the bending stresses are exerted on a part of the tube end distal from the part of the tube end provided with the thread, such that the part provided with the thread is virtually only subjected to axial forces.

Preferably, the diameter of the cylindrical surface is equal to the pitch diameter. This allows for a smooth transition from the cylindrical surface towards the threaded part.

In a further preferred embodiment of the tube connection according to the invention, the maximum diameter and minimum diameter are equal at the start of the thread.

This ensures that the thread starts with a thread depth of zero and a tube end with a diameter corresponding to the pitch diameter can be inserted into the tube connection. Then by rotating the tube end and further inserting the tube end into the through hole, the desired flared out shape of the tube end is provided by the internal thread of the tube connection.

In yet a further preferred embodiment of the tube connection according to the invention the minimum diameter decreases at an angle of 1°-5°.

An angle of 1°-5° allows for a tube end to be screwed into the tube connection without additional axial force and no additional specialized tools.

In still a further preferred embodiment of the tube connection according to the invention, the body comprises a hexagonal prism shape, wherein the axis of the hexagonal prism is coaxial with the central axis.

With the hexagonal prism shape a typical wrench or spanner can be used to connect the tube connection of the invention with a tube end.

FIG. 1 shows a tube connection 1 with a body 2 having a through hole 3. The first end of the through hole 3 is provided with a cylindrical part 4 followed by an internal thread 5.

On the second end, the body 2 is provided on the outer surface 6 with a hose connection. Furthermore, a hexagonal prism shape 7 is provided on the body 2 to allow engagement of a wrench or spanner.

The thread 5 has a constant pitch diameter $D_p$, while the minimal diameter $D_{min}$ decreases from the cylindrical part 4 towards the second end of the body and the maximal diameter $D_{max}$ increases from the cylindrical part 4 towards the second end.

The minimum diameter $D_{min}$ decreases at an angle α, which is preferably between 1° and 5°, such that no additional axial force is required when a tube end 8 is screwed into the tube connection 1.

The maximum diameter $D_{max}$ increases in the same amount as the minimum diameter decreases $D_{min}$. This ensures that the pitch diameter $D_p$ is constant, but also ensures that the amount of material deformed by the minimum diameter $D_{min}$ can be pushed towards the expanding space as a result of the increasing maximum diameter $D_{max}$.

The tube end 8 inserted into the tube connection 1 and shown in exploded view in FIG. 1 has a normal diameter $D_{norm}$. Due to the shape of the thread 5, the end of the tube end 8 flares out to an expanded diameter $D_{exp}$, which provides a shaped defined connection of the tube end 8 with the tube connection 1.

Figure 2:
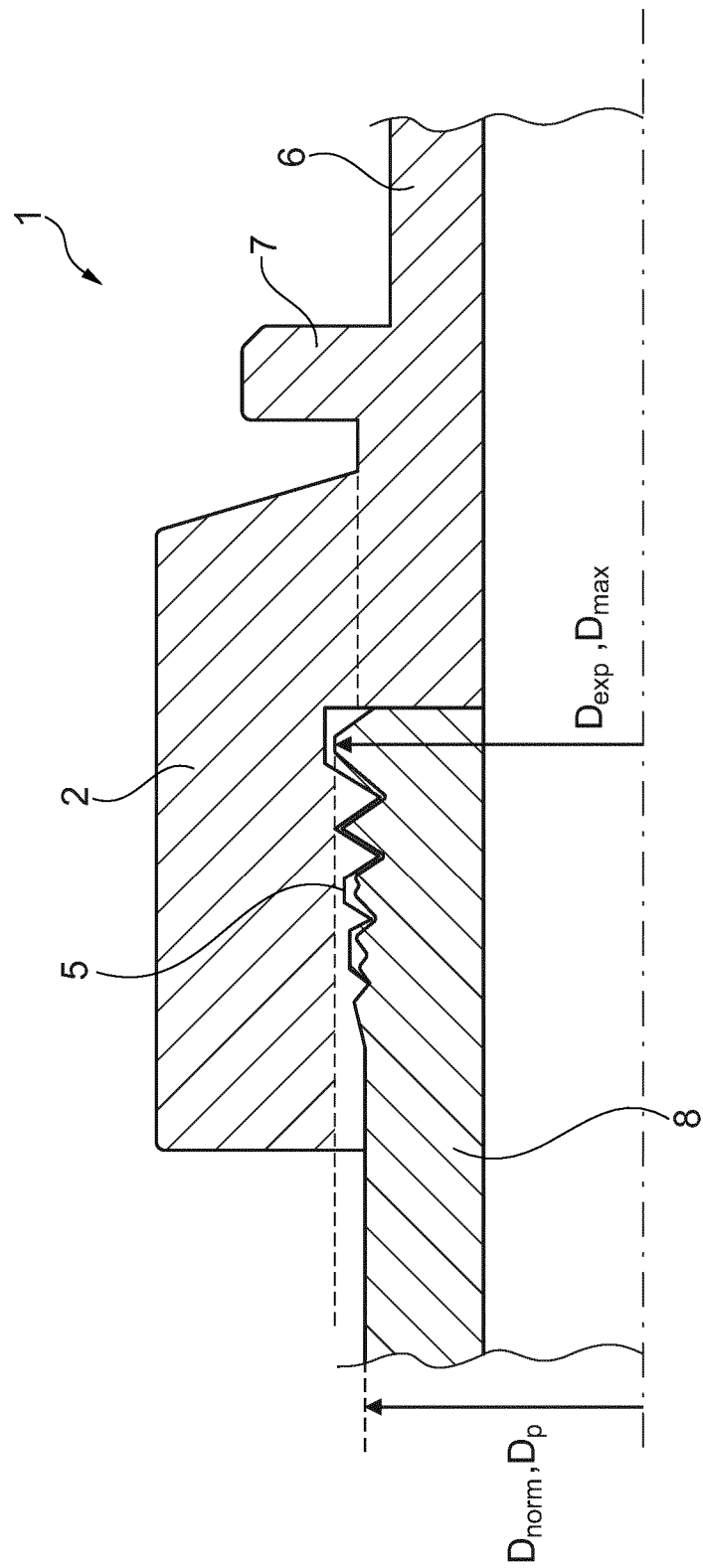
FIG. 2 shows the embodiment of FIG. 1 in assembled state.

FIG. 2 shows the tube end 8 and the tube connection 1 is assembled state. The normal diameter $D_{norm}$ corresponds to the pitch diameter $D_p$ of the thread. The end of the tube end 8 is flared out to the expanded diameter $D_{exp}$, which is almost identical to the maximum diameter $D_{max}$ at this position of the thread 5.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A tube connection for connection to a tube, comprising:
a body having a through hole with a central axis, a first end, a second end, and an internal thread arranged close to the first end and coaxial with the central axis,
wherein the internal thread has a constant pitch diameter,
wherein a maximum diameter of the internal thread increases in an axial direction from the first end towards the second end, and
wherein a minimum diameter of the internal thread decreases in the axial direction from the first end towards the second end.

2. The tube connection according to claim 1, wherein the maximum diameter and minimum diameter are equal at a start of the thread.

3. The tube connection according to claim 1, wherein the minimum diameter decreases at an angle of 1°-5°.

4. The tube connection according to claim 1, wherein the body comprises a hexagonal prism shape, and
wherein an axis of the hexagonal prism shape is coaxial with the central axis.

5. A tube connection for connection to a tube, comprising:
a body having a through hole with a central axis, a first end, a second end, and an internal thread arranged close to the first end and coaxial with the central axis,
wherein the internal thread has a constant pitch diameter and starts at a distance from the first end such that a cylindrical surface is provided in the through hole between the first end and the thread,
wherein a maximum diameter of the internal thread increases in an axial direction from the first end towards the second end, and
wherein a minimum diameter of the internal thread decreases in the axial direction from the first end towards the second end.

6. The tube connection according to claim 5, wherein a diameter of the cylindrical surface is equal to a pitch diameter.

* * * * *